(12) United States Patent
Ragot et al.

(10) Patent No.: US 11,794,595 B2
(45) Date of Patent: Oct. 24, 2023

(54) ENERGY STORAGE MOUNTING SYSTEM

(71) Applicant: Volvo Truck Corporation, Gothenburg (SE)

(72) Inventors: Sébastien Ragot, Gothenburg (SE); Jonatan Hörder, Mölndal (SE)

(73) Assignee: Volvo Truck Corporation, Gothenburg (SE)

(*) Notice: Subject to any disclaimer, the term of this patent is extended or adjusted under 35 U.S.C. 154(b) by 100 days.

(21) Appl. No.: 17/504,779

(22) Filed: Oct. 19, 2021

(65) Prior Publication Data

US 2022/0126706 A1 Apr. 28, 2022

(30) Foreign Application Priority Data

Oct. 26, 2020 (EP) ..................................... 20203844

(51) Int. Cl.
*B60K 1/02* (2006.01)
*B60L 50/60* (2019.01)
*B60K 1/04* (2019.01)

(52) U.S. Cl.
CPC ................ *B60L 50/66* (2019.02); *B60K 1/04* (2013.01); *B60K 2001/0405* (2013.01); *B60K 2001/0472* (2013.01); *B60L 2200/40* (2013.01)

(58) Field of Classification Search
CPC ... B60L 50/66; B60K 1/04; B60K 2001/0405; B60K 2001/0472; B60K 2001/0461; B60K 2001/0488
See application file for complete search history.

(56) References Cited

U.S. PATENT DOCUMENTS 9,457,652 B2 * 10/2016 Sloan ..................... B60K 15/07
10,166,883 B2 * 1/2019 Brendecke .............. B60L 58/26
(Continued)

FOREIGN PATENT DOCUMENTS

| CN | 103121442 B | 8/2015 |
| CN | 109177709 A | 1/2019 |

(Continued)

OTHER PUBLICATIONS

Extended European Search Report for European Patent Application No. 20203844.4, dated Feb. 17, 2021, 8 pages.

*Primary Examiner* — Jason D Shanske
*Assistant Examiner* — James J Triggs
(74) *Attorney, Agent, or Firm* — Withrow & Terranova, PLLC (57) ABSTRACT

The present disclosure relates to energy storage mounting system for an energy storage system of a vehicle, the mounting system comprising: a vehicle mounting member connectable to a longitudinal frame of the vehicle, the vehicle mounting member comprising an elongated portion arranged to, when the vehicle mounting member is attached to the longitudinal frame, extend away from the longitudinal frame, wherein the elongated portion comprises a recess at an outer end portion thereof; and a battery mounting member connectable to the energy storage system, the battery mounting member comprising a connecting portion, wherein the connecting portion is movable between a disconnected state, in which the connecting portion is positioned at a distance from the elongated portion of the vehicle mounting member, and a connected state, in which the connecting portion is positioned in the recess for connecting the battery mounting member to the vehicle mounting member.

12 Claims, 7 Drawing Sheets

(56) References Cited

U.S. PATENT DOCUMENTS

| | | | |
|---|---|---|---|
| 11,121,427 B1* | 9/2021 | Bustamante Laparra | ................... H02J 7/0014 |
| 11,364,781 B2* | 6/2022 | Zhang | ................. H01M 50/264 |
| 2021/0380001 A1* | 12/2021 | Hörder | ................... B60L 50/64 |
| 2022/0340151 A1* | 10/2022 | Farag | ................... B60L 3/0038 |
| 2023/0015644 A1* | 1/2023 | Hörder | ................ H01M 50/249 |

FOREIGN PATENT DOCUMENTS

| | | | | |
|---|---|---|---|---|
| WO | 2019151131 A1 | 8/2019 | | |
| WO | 2020041630 A1 | 2/2020 | | |
| WO | WO-2020041630 A1 * | 2/2020 | .............. | B60K 1/04 |
| WO | 2020200459 A1 | 10/2020 | | |
| WO | 2020207592 A1 | 10/2020 | | |

* cited by examiner

ENERGY STORAGE MOUNTING SYSTEM

RELATED APPLICATION

The present application claims priority to European Patent Application No. 20203844.4, filed on Oct. 26, 2020, and entitled "ENERGY STORAGE MOUNTING SYSTEM," which is incorporated herein by reference in its entirety.

TECHNICAL FIELD

The present disclosure relates to an energy storage mounting system for an energy storage system. The present disclosure also relates to a method for mounting an energy storage system using the energy storage mounting system, as well as a vehicle comprising such an energy storage mounting system. Although the energy storage mounting system will mainly be described in relation to a heavy-duty vehicle, i.e. a truck, it may also be applicable for other types of vehicles comprising longitudinally extending frame rails at which an energy storage systems is connected.

BACKGROUND

The propulsion systems of vehicles are continuously developed to meet the demands from the market. A particular aspect relates to the emission of environmentally harmful exhaust gas. Therefore, vehicles propelled by electric machines have been increasingly popular, both for cars as well as for trucks and other heavy duty vehicles.

In relation to heavy duty vehicles, the battery connected to the electric machine arranged to propel the vehicle needs to be relatively large to be able to deliver a substantial amount of electric power to the electric machine(s), in particular when aiming for covering a long driving range without having to frequently re-charge the battery.

A conventional placement of the batteries in a heavy duty vehicle is along the longitudinally extending frame rails of the vehicle. This is substantially the same position as used for the fuel tanks of a truck using an internal combustion engine for propulsion. However, since the batteries are heavy components, the assembly/disassembly process is rather time consuming, in comparison to e.g. the replacement/mounting of an empty fuel tank. There is thus a desire to enable for a simplified and more time efficient assembly/disassembly process for energy storage systems such as batteries.

SUMMARY

It is therefore an object of the present disclosure to describe an energy storage mounting system which at least partially overcomes the above described deficiencies. This is achieved by an energy storage mounting system.

According to a first aspect, there is provided an energy storage mounting system for an energy storage system of a vehicle, the mounting system comprising a vehicle mounting member connectable to a longitudinal frame of the vehicle, the vehicle mounting member comprising an elongated portion arranged to, when the vehicle mounting member is attached to the longitudinal frame, extend away from the longitudinal frame, wherein the elongated portion comprises a recess at an outer end portion thereof; and a battery mounting member connectable to the energy storage system, the battery mounting member comprising a connecting portion, wherein the connecting portion is movable between a disconnected state, in which the connecting portion is positioned at a distance from the elongated portion of the vehicle mounting member, and a connected state, in which the connecting portion is positioned in the recess for connecting the battery mounting member to the vehicle mounting member.

The energy storage system may preferably comprise one or several battery modules arranged to supply electric current to electric power consumer of the vehicle. The battery module(s) are thus arranged within a compartment/housing which is connectable to the battery mounting member. The electric power consumer may preferably be an electric machine arranged to propel the vehicle during operation. However, the energy storage system may also be one or several fuel cells arranged within the compartment/housing connectable to the battery mounting member. Accordingly, the battery mounting member should not be construed as solely being connectable to a battery.

Moreover, the recess at the outer end portion should be construed as being arrangeable in a number of different ways. According to an example as is also described below, the recess may be arranged to extend from the outer end portion of the elongated portion and in a direction towards the longitudinal frame when the vehicle mounting member is connected to the frame. In such a case, the recess extends in a direction which is substantially perpendicular to the longitudinal extension of the frame, i.e. in a transversal direction of the vehicle. As an alternative, the recess may be arranged to extend from the outer end portion of the elongated portion, and in a direction which is non-perpendicular to the longitudinal extension of the frame. The recess may thus be arranged at an angle less than ninety degrees with the longitudinal frame.

Furthermore, the connecting portion may also be arranged in a number of different configurations as long as it can mate with the recess of the elongated portion. Different embodiments of the connecting portion will be given below.

An advantage is that the assembly/disassembly process of the energy storage system to/from the vehicle is simplified. In particular, when the connecting portion is arranged in the disconnected state, the energy storage system can be lifted to its final, assembly position, whereby the connecting portion is transitioned from the disconnected state to the connected state. The energy storage system is preferably lifted to its final position using a suitable lifting arrangement and, when the connecting portion assumes the connected state, secured to the energy mounting system. The energy storage system can thus hang in the connecting portion when the connecting portion assumes the connected state, where after the connecting portion can finally secure the energy storage system by e.g. attachment of a nut as will be described below. The present disclosure is thus advantageous during production of the vehicle as well as during maintenance.

According to an example embodiment, the connecting portion may be an elongated connecting portion rotatably connected to the battery mounting member. According to an example embodiment, the connecting portion may be movable between the disconnected state and the connected state by rotation around a pivot joint of the battery mounting member.

By rotatably connected should be construed such that the connecting portion is exposed to a rotation when being moved between the disconnected state and the connected state. Thus, the connecting portion and the battery mounting member is connected to each other at the pivot joint arranged at an inner portion of the connecting portion. The inner portion is hereby meant an opposite side of the connecting portion compared to the portion arranged in the recess when the connecting portion assumes the connected state.

An advantage is that the transition from the disconnected state to the connected state can be executed by a simple rotational movement. Such rotational movement can be executed without the use an external tool. The rotatable connection can also secure that the energy storage system can be lifted to its final position without interfering with the connecting portion.

According to an example embodiment, the connecting portion may comprise a springing portion allowing a spring action along the elongation of the connecting portion.

Hereby, the connecting portion can be extended when transitioning between the disconnected state and the connected state. An advantage is that the connecting portion can be snap-fitted into the recess. Also, being able to extend the length of the connecting portion will increase the flexibility of the assembly process as the connecting portion can be arranged in the recess even when the vehicle mounting member and the battery mounting member are arranged at a slight distance from each other. Accordingly, and according to an example embodiment, the connecting portion may be movable between the disconnected state and the connected state by extending the connecting portion at the springing portion.

The springing portion may be arranged in a number of different manners as long as providing a spring characteristics along the elongation of the connecting portion. The springing portion may be provided by means of an elastic material, a spring, or similar.

According to an example embodiment, and as briefly indicated above, the recess may extend from the outer end portion in a direction towards a surface of the vehicle mounting member which is arranged to abut the longitudinal frame, wherein a width of the recess is increased at the outer end portion.

By increasing the width at the outer end portion, a self-centering effect is achieved since the connecting portion can be slightly offset to the recess and guided into the recess via the extended width at the outer end portion.

According to an example embodiment, the battery mounting member may comprise a cavity portion, the elongated portion of the vehicle mounting member comprises a connecting surface arranged in abutment with a surface of the cavity portion when the connecting portion assumes the connected state.

Preferably, the surface of the cavity portion is facing upwards and the connecting surface of the vehicle mounting member is facing downwards. Hereby, the connecting surface of the vehicle mounting member is advantageously in abutment with the surface of the cavity portion before the connecting portion assumes the connected state. An advantage is that an operator will be able to determine when it is time to move the connecting portion from the disconnected state to the connected state.

According to an example embodiment, the surface of the cavity portion may be an inclined surface. The surface of the cavity portion is preferably inclined downwards towards the longitudinal frame when the battery mounting member and the vehicle mounting member are connected to each other, and the connecting portion assumes the connected state. According to an example embodiment, the connecting surface of the battery mounting member may be an inclined connecting surface arranged to mate with the inclined surface of the cavity portion. The connecting surface of the vehicle mounting member is thus preferably inclined upwards towards the energy storage system when the battery mounting member and the vehicle mounting member are connected to each other and the connecting portion assumes the connected state.

According to an example embodiment, the connecting portion may be connected to the battery mounting member in the cavity portion.

According to an example embodiment, a width of the recess may be larger than a dimension of the connecting portion for providing a geometric play between the recess and the connecting portion when the connecting portion assumes the connected state. The dimension of the connecting portion should be construed as e.g. a diameter, or other cross-sectional distance, of the connecting portion that is arranged to be directed into the recess when the connecting portion transitions from the disconnected state to the connected state.

According to an example embodiment, the connecting portion may comprise a screw and nut connection, the screw and nut connection being configured to generate a compression force on the elongated portion after the connecting portion assumes the connected state. Hereby, a final secure attachment if the battery mounting member to the vehicle mounting member is achieved.

According to an example embodiment, the battery mounting member may be arranged as a casted bracket, the casted bracket being connectable to the energy storage system.

According to a second aspect, there is provided a method for mounting an energy storage system to a longitudinal frame of a vehicle, wherein the longitudinal frame comprises a vehicle mounting member comprising an elongated portion, the elongated portion comprising a recess at an outer end portion away from the longitudinal frame, wherein the energy storage system comprises a battery mounting member comprising a connecting portion, the method comprising: positioning a surface of the battery mounting member in abutment with a connecting surface of the vehicle mounting member; and moving the connecting portion into the recess of the elongated portion.

Effects and features of the second aspect are largely analogous to those described above in relation to the first aspect.

According to a third aspect, there is provided a vehicle, comprising a longitudinal frame and an energy storage system, wherein the energy storage system comprises an energy storage mounting system according to any one of the embodiments described above in relation to the first aspect.

Effects and features of the third aspect are also largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein:

FIGS. 2a-5b illustrate the energy storage mounting system and the assembly process of mounting the energy storage system to the frame of the vehicle according to an example embodiment.

DETAILED DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1A:
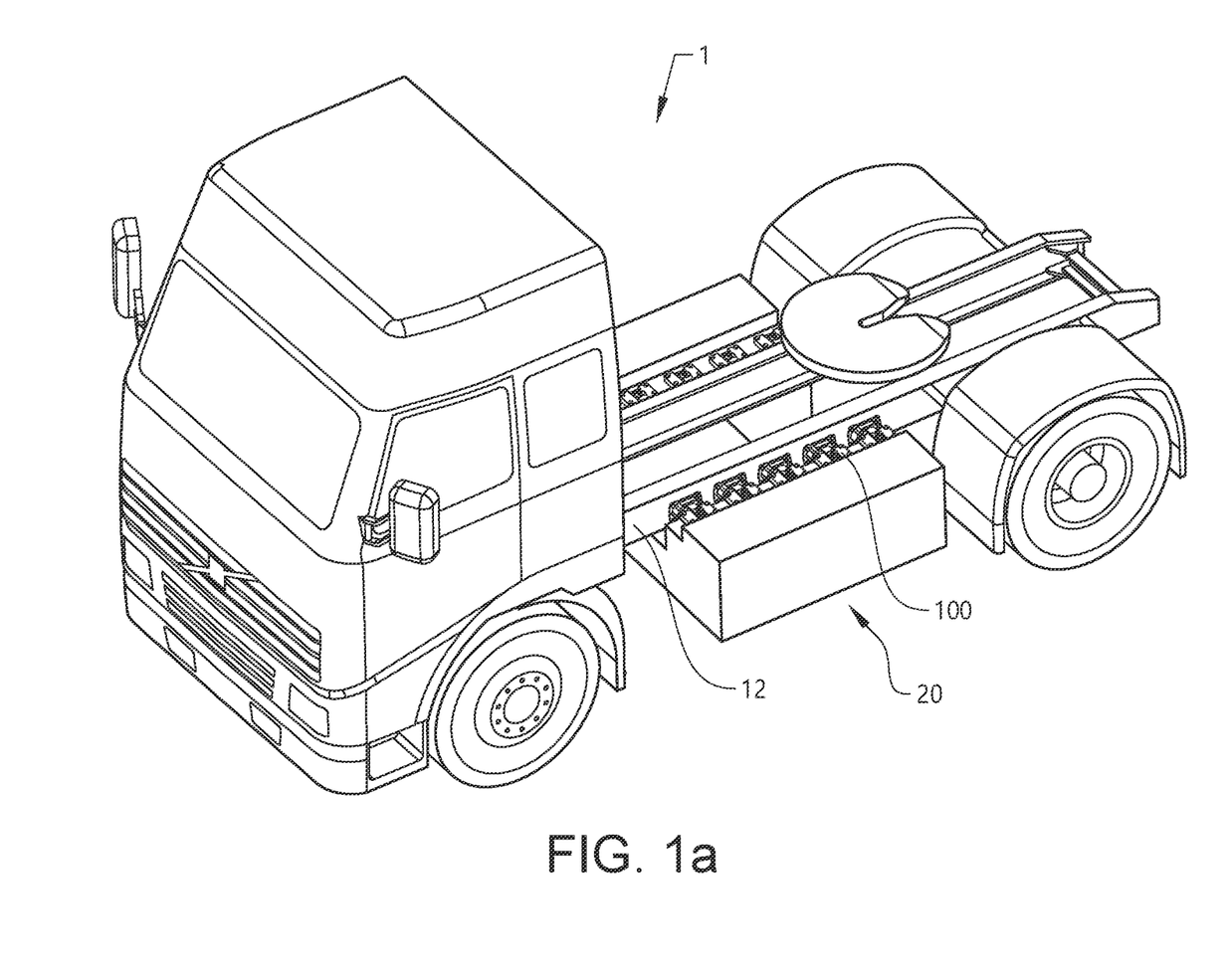
FIG. 1a is a perspective view illustrating a vehicle according to an example embodiment.

With particular reference to FIG. 1a, there is provided a vehicle 1 in the form of a truck. The vehicle 1 comprises a frame structure composed of two longitudinal frames 10, whereby an energy storage system 20 is connected to the longitudinal frames 10 by means of a plurality of energy storage mounting systems 100. According to the example depicted in FIG. 1a, the energy storage mounting system 100 is arranged on an outside surface 12 of the longitudinal frame 10. Hence, the outside surface 12 of the first longitudinal frame faces away from the outside surface 12 of the second longitudinal frame. The energy storage system is preferably arranged to contain an energy storage module, e.g. one or more batteries, or one or more fuel cells, arranged to supply energy to an energy consumer such as a prime mover of the vehicle. When the energy storage system 20 comprises one or more batteries, the prime mover is preferably an electric machine.

Figure 1B:
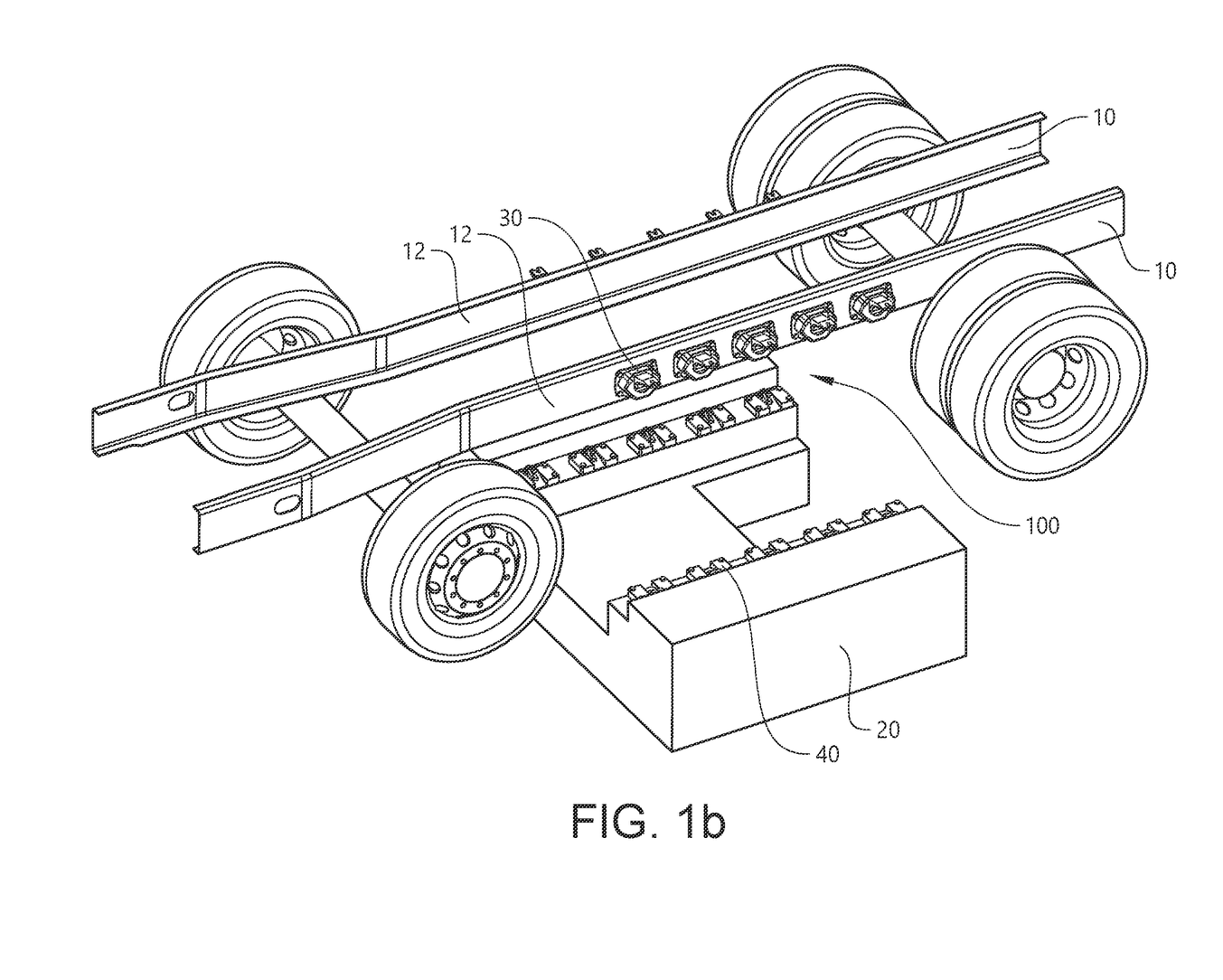
FIG. 1b illustrates the frame of the vehicle in FIG. 1a, and in particular its connection to the energy storage system and the energy storage mounting system according an example embodiment.

Turning to FIG. 1b, which is an exploded view illustrating the energy storage mounting system 100 connecting the energy storage system 20 to the frame 12 in further detail. As can be seen, the energy storage system 20 is connected to the frame 12 by means of a plurality of energy storage mounting systems 100, in FIG. 1b exemplified as five energy storage mounting systems 100 on each side of the pair longitudinal frames 12. As is depicted in FIG. 1b, the energy storage mounting systems 100 comprises a vehicle mounting member 30 connected to the outside surface 12 of the frame 10, and a battery mounting member 40 connected to the energy storage system 20. The energy storage system 20 is thus connected to the longitudinal frames 10 and arranged below the longitudinal frames 10. In particular, the energy storage system 20 extends between, and below the pair of longitudinal frames 10.

Figure 2A:
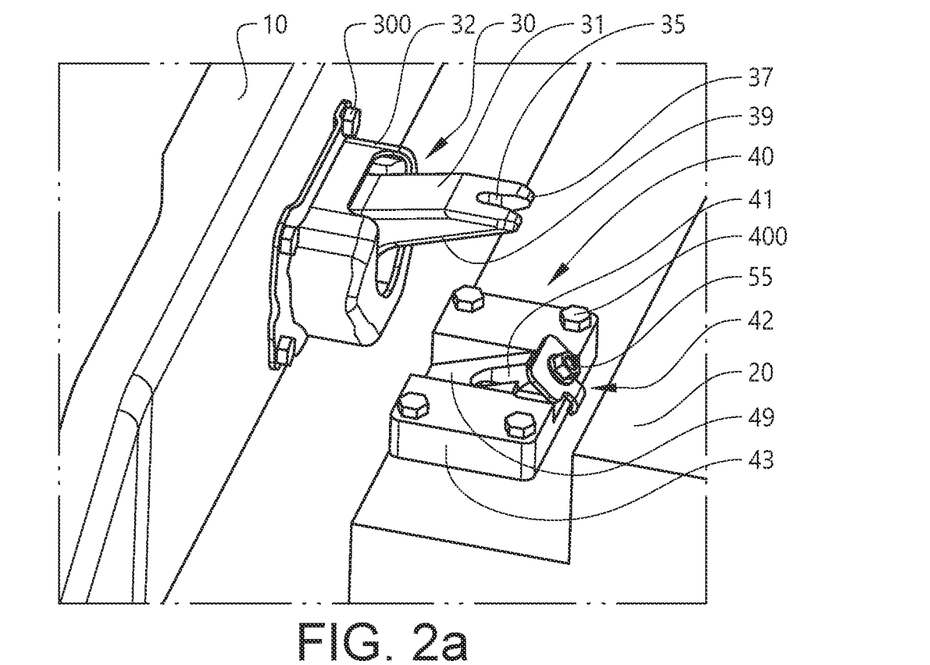

In order to describe the energy storage mounting system 100 in further detail, reference is made to FIGS. 2a-5b. With particular reference to FIGS. 2a-2b, the vehicle mounting member 30 of the energy storage mounting system 100 comprises an elongated portion 31. The elongated portion 31 is arranged in a housing 32 of the vehicle mounting member 30. The housing 32 is in turn connected to one of the longitudinal frames 10, preferably by means of screws or bolts 300. The elongated portion 31 is preferably connected to the housing 32 using a bushing or similar arrangement for allowing a slight vertical, longitudinal and transversal motion of the elongated portion 31 portion relative to the housing 32.

Figure 2B:
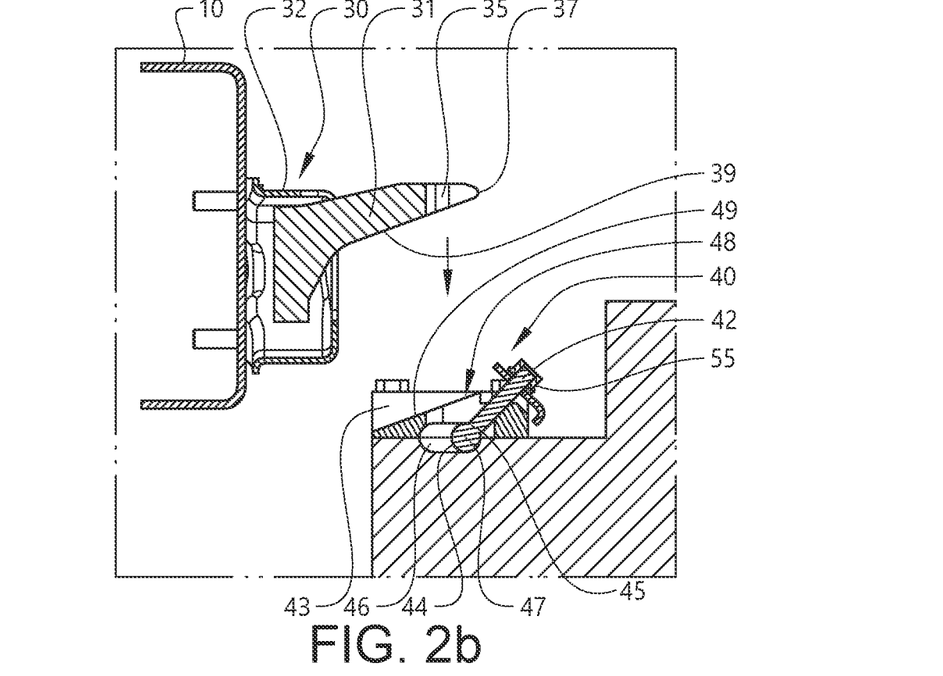

As is further depicted, the elongated portion 31 extends in a direction away from the longitudinal frame 10 and comprises a recess 35 at an outer end portion 37 thereof. According to the example depicted in the figures, the outer end portion 37 is arranged on an opposite side of the elongated portion 31 compared to the housing 32. The recess 35 hereby extends from the outer end portion 37 in a direction towards the housing 32. Further, a width of the recess 35, as seen in the longitudinal direction of the vehicle 1, is larger at the outer end portion 37 compared to a position closer to the housing 32. The vehicle mounting member 30 further comprises a connecting surface 39. The connecting surface 39 is preferably, and as depicted in the figures, arranged as an inclined connecting surface 39 having a surface normal facing downwards with an angle corresponding to the angle of the inclination.

The energy storage mounting system 100 also comprises a battery mounting member 40 which is connected to the energy storage system 20. The battery mounting member 40 is preferably arranged as a bracket 43 connected to the energy storage system 20, preferably by means of screws or bolts 400. As is depicted, the battery mounting member 40 comprises an elongated connecting portion 42 which in FIG. 2a assumes a disconnected state. As is depicted in detail in FIG. 2b, an inner end portion 44 of the connecting portion 42 is rotatably connected to the battery mounting member 40. In particular, the inner end portion of the connecting portion 42 is connected to the bracket 43 by means of a pivot joint 47. The inner end portion 44 is preferably arranged in a trace 46 of the bracket 43. The trace 46 extends in a transversal direction for allowing a transversal movement of the connecting portion 42. In further detail, the battery mounting member 40 comprises a cavity portion 48 in which the connecting portion 42 is rotatably connected. In yet further detail, the inner end portion 44 of the connecting portion 42 is arranged in a cut-out part 41 of the cavity portion 48 and the connecting portion 42 is thus, in the disconnected state depicted in FIG. 2b, resting in the cavity portion 48.

Although not depicted in the figures, the inner end portion 44 is also connected to the bracket 43 in such a way that the inner end portion 44 is movable in the longitudinal direction of the vehicle. The trace 46 thus has an extension also in the longitudinal direction. An advantage is that a simplified alignment between the connecting portion and the recess can be achieved during the mounting process described below.

Moreover, the cavity portion 48 comprises a surface 49 which is preferably inclined downwards as seen towards the longitudinal frame 10. The surface 49 of the cavity portion 48 has a surface normal facing upwards with an angle corresponding to the angle to of the inclination.

Still further, the connecting portion 42 comprises a springing portion 45. Hereby, the connecting portion 42 can be extended in its longitudinal direction when exposed to a tractive force. The springing portion 45 is preferably arranged as a spring in the area of the pivot joint 47 which allows a longitudinal extension of the connecting portion 42. The connecting portion also comprises a screw and nut connection 55. As will be described further below, the screw and nut connection 55 is arranged to generate a compression force on the elongated portion 31 after the connecting portion assumes the connected state.

The following will now, with reference to FIGS. 3a-5b, describe the procedure of mounting the energy storage system 20 to the longitudinal frame 10 of the vehicle 1.

Figure 3A:
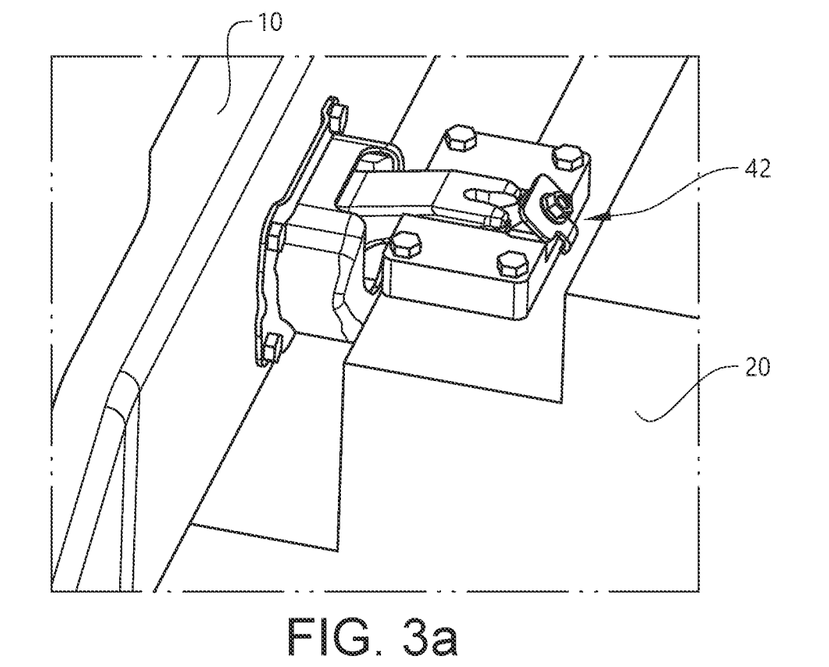
Figure 3B:
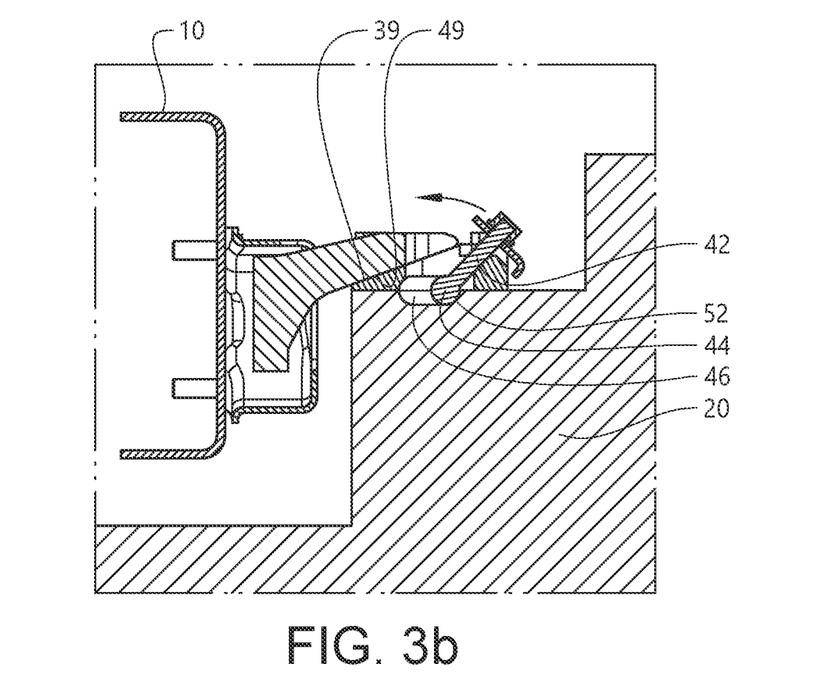

As can be seen in FIGS. 3a-3b, the energy storage system 20 is arranged in its final position, but still not sufficiently connected to the longitudinal frame 10. The connecting surface 39 of the vehicle mounting member 30 is arranged in abutment with the surface 49 of the cavity portion. In detail, the inclined connecting surface 39 mates with the inclined surface 49 of the cavity portion. The connecting portion 42 assumes a disconnected state, which means that the connecting portion 42 is not yet connected to the recess 35 of the vehicle mounting member 30. The inner end portion 44 of the connecting portion 42 is in the embodiment of FIG. 3b arranged at a first end 52 of the trace 46.

Figure 4A:
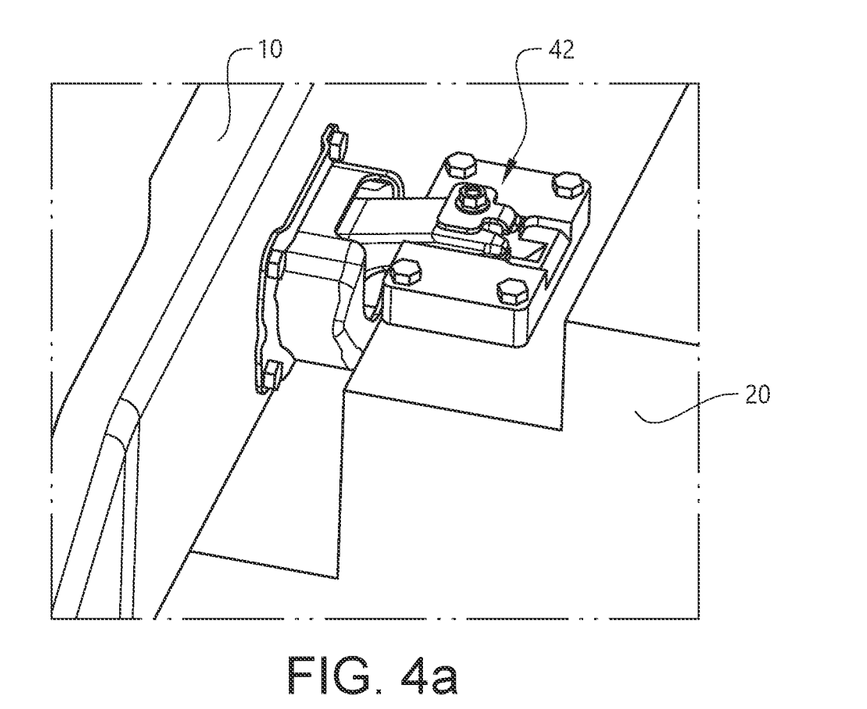
Figure 4B:
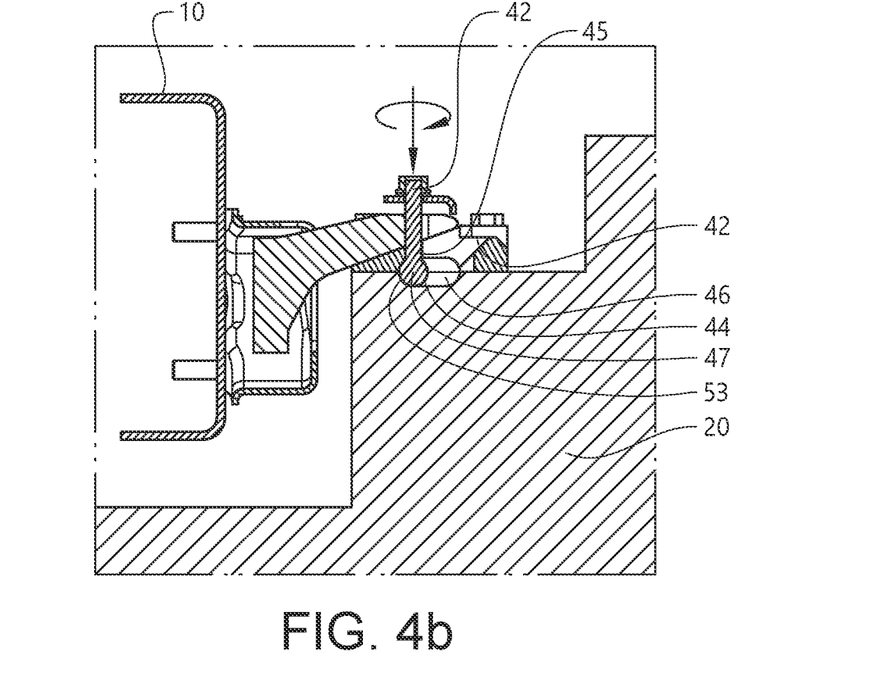

The connecting portion 42 is thereafter transitioned from the disconnected state, depicted in FIGS. 3a-3b, to a connected state depicted in FIGS. 4a-4b. As can be seen in FIG. 4b, the connecting portion 42 has been moved from the disconnected state to the connected state by means of a rotational movement around the pivot joint 47. The connecting portion 42 is hereby, in the connected state, positioned in the recess 35 of the vehicle mounting member 30. As described briefly above, the connecting portion 42 comprises a springing portion 45. The connecting portion 42 can hereby also be extended when being transitioned from the disconnected state to the connected state. As is also depicted in FIG. 4b, the inner end portion 44 of the connecting portion 42 has been moved from the first end 52 to a second end 53 of the trace 46. The second end 53 is thus positioned closer to the housing 32 compared to the first end 52.

Figure 5A:
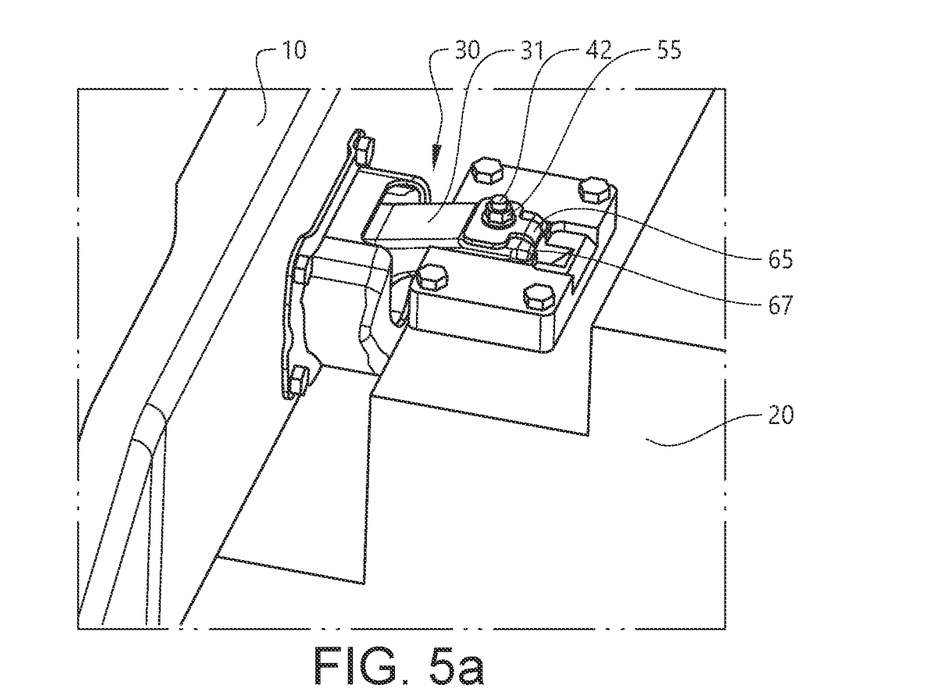
Figure 5B:
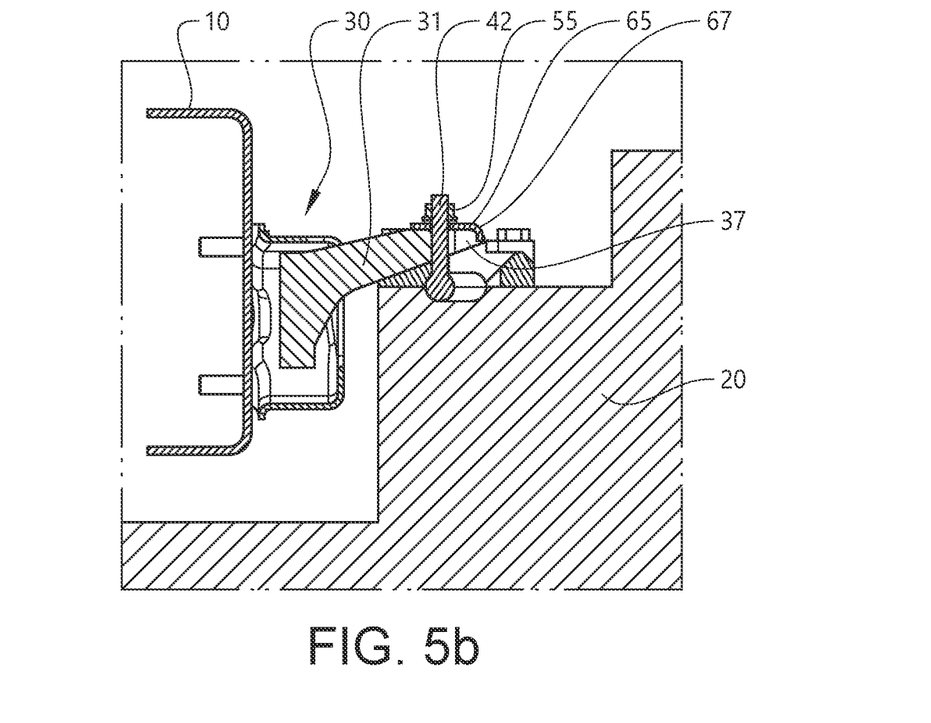

When the connecting portion 42 assumes the connected state as, illustrated in FIGS. 4a-4b and described above, the screw and nut connection 55 of the connecting portion is fixated, as is illustrated in FIGS. 5a-5b. In detail, the nut is tightened on the connecting portion to generate a compression force on the connecting portion 42. Hereby, the connecting portion 42 is tightly connected to the elongated portion 31 of the vehicle mounting member 30. As is depicted in e.g. FIGS. 5a-5b, the screw and not connection 55 may also comprise a washer 65. The washer 65 preferably comprises an edge 67 arranged to grip around the outer end portion 37 of the elongated portion 31.

Figure 6:
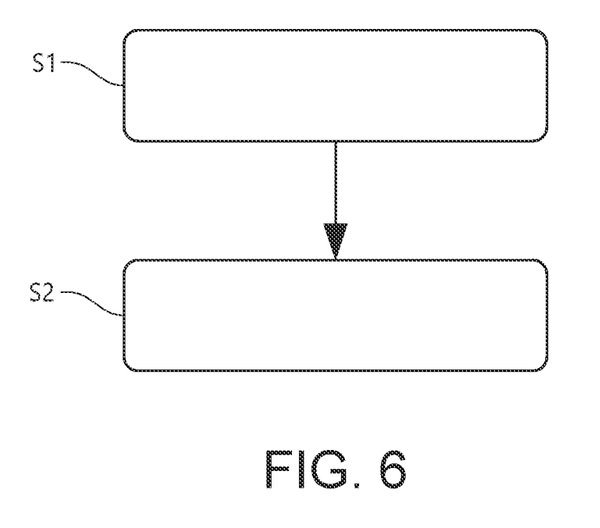
FIG. 6 is a flow chart of the method for mounting the energy storage system to the longitudinal frame.

In order to sum up, reference is made to FIG. 6 which is a flow chart of a method for mounting the energy storage system to the longitudinal frame of the vehicle. In a first step, the surface 49 of the battery mounting member 40 is positioned S1 in abutment with the connecting surface 39 of the vehicle mounting member 30 as is depicted in FIGS. 3a-3b. Thereafter, the connecting portion 42 is moved S2 into the recess 35 of the elongated portion 31 as depicted and described above in relation to FIGS. 4a-4b. Finally, the nut is screwed onto the connecting portion for fixating the energy storage system 20 to the vehicle frame 10 as depicted in FIGS. 5a-5b.

It is to be understood that the present disclosure is not limited to the embodiments described above and illustrated in the drawings; rather, the skilled person will recognize that many changes and modifications may be made within the scope of the appended claims.

The invention claimed is:

1. An energy storage mounting system for an energy storage system of a vehicle, the mounting system comprising:
   a vehicle mounting member connectable to a longitudinal frame of the vehicle, the vehicle mounting member comprising an elongated portion configured to, when the vehicle mounting member is attached to the longitudinal frame, extend away from the longitudinal frame, wherein the elongated portion comprises a recess at an outer end portion thereof; and
   a battery mounting member connectable to the energy storage system, the battery mounting member comprising an elongated connecting portion, wherein the connecting portion is movable between a disconnected state, wherein the connecting portion is positioned at a distance from the elongated portion of the vehicle mounting member, and a connected state, wherein the connecting portion is positioned in the recess for connecting the battery mounting member to the vehicle mounting member, wherein the connecting portion is rotatably connected to the battery mounting member, and wherein the connecting portion is movable between the disconnected state and the connected state by rotation around a pivot joint of the battery mounting member.

2. The energy storage mounting system of claim 1, wherein the connecting portion comprises a springing portion allowing a spring action along the elongation of the connecting portion.

3. The energy storage mounting system of claim 2, wherein the connecting portion is movable between the disconnected state and the connected state by extending the connecting portion at the springing portion.

4. The energy storage mounting system of claim 1, wherein the recess extends from the outer end portion in a direction towards a surface of the vehicle mounting member arranged to abut the longitudinal frame, wherein a width of the recess is increased at the outer end portion.

5. The energy storage mounting system of claim 1, wherein the battery mounting member comprises a cavity portion, the elongated portion of the vehicle mounting member comprises a connecting surface arranged in abutment with a surface of the cavity portion when the connecting portion assumes the connected state.

6. The energy storage mounting system of claim 5, wherein the surface of the cavity portion is an inclined surface.

7. The energy storage mounting system of claim 6, wherein the connecting surface of the battery mounting member is an inclined connecting surface arranged to mate with the inclined surface of the cavity portion.

8. The energy storage mounting system of claim 5, wherein the connecting portion is connected to the battery mounting member in the cavity portion.

9. The energy storage mounting system of claim 1, wherein a width of the recess is larger than a dimension of the connecting portion for providing a geometric play between the recess and the connecting portion when the connecting portion assumes the connected state.

10. The energy storage mounting system of claim 1, wherein the connecting portion comprises a screw and nut connection, the screw and nut connection being configured to generate a compression force on the elongated portion after the connecting portion assumes the connected state.

11. The energy storage mounting system of claim 1, wherein the battery mounting member is arranged as a casted bracket, the casted bracket being connectable to the energy storage system.

12. A vehicle comprising:
   a longitudinal frame; and
   an energy storage system comprising an energy storage mounting system comprising:
   a vehicle mounting member connectable to the longitudinal frame of the vehicle, the vehicle mounting member comprising an elongated portion configured to, when the vehicle mounting member is attached to the longitudinal frame, extend away from the longitudinal frame, wherein the elongated portion comprises a recess at an outer end portion thereof; and a battery mounting member connectable to the energy storage system, the battery mounting member comprising a connecting portion, wherein the connecting portion is movable between a disconnected state, wherein the connecting portion is positioned at a distance from the elongated portion of the vehicle mounting member, and a connected state, wherein the connecting portion is positioned in the recess for connecting the battery mounting member to the vehicle mounting member, wherein the connecting portion is an elongated connecting portion rotatably connected to the battery mounting member, and wherein the connecting portion is movable between the disconnected state and the connected state by rotation around a pivot joint of the battery mounting member.

\* \* \* \* \*